United States Patent
Garcia et al.

(10) Patent No.: US 12,437,255 B2
(45) Date of Patent: Oct. 7, 2025

(54) SMART CLAW VEHICLE-BASED PACKAGE MANAGEMENT SYSTEM

(71) Applicant: Ford Global Technologies, LLC, Dearborn, MI (US)

(72) Inventors: Jair Garcia, Tepotzotl (MX); Rafael Medina, CDMX (MX); Victor Jose Cisneros Moreno, Mexico City (MX); Gerson Figueroa Flores, Coacalco (MX)

(*) Notice: Subject to any disclaimer, the term of this patent is extended or adjusted under 35 U.S.C. 154(b) by 614 days.

(21) Appl. No.: 17/931,663

(22) Filed: Sep. 13, 2022

(65) Prior Publication Data
US 2024/0086820 A1    Mar. 14, 2024

(51) Int. Cl.
*G06Q 10/083* (2024.01)
*B25J 5/02* (2006.01)
(Continued)

(52) U.S. Cl.
CPC .............. *G06Q 10/083* (2013.01); *B25J 5/02* (2013.01); *B25J 9/00* (2013.01); *B25J 15/0014* (2013.01);
(Continued)

(58) Field of Classification Search
CPC ... G06Q 10/083; B25J 5/02; B25J 9/00; B25J 15/0014; B60P 1/00; B60P 1/5438;
(Continued)

(56) References Cited

U.S. PATENT DOCUMENTS 4,693,505 A * 9/1987 DiMeo ...................... F16D 3/74
                                                        294/86.4
5,406,770 A * 4/1995 Fikacek .................. B65B 5/105
                                                        53/238
(Continued)

FOREIGN PATENT DOCUMENTS

CN    204057192 U  * 12/2014
CN    206287898 U  *  6/2017
(Continued)

OTHER PUBLICATIONS

Boston Dynamics' Latest Innovation is a Box-Moving Robot Named Stretch, Mar. 29, 2021.

*Primary Examiner* — Ernesto A Suarez
*Assistant Examiner* — Laurence R Brothers
(74) *Attorney, Agent, or Firm* — Emily Drake; Eversheds Sutherland (US) LLP (57) ABSTRACT

A delivery vehicle for autonomously delivering a plurality of packages is described. The delivery vehicle includes a set of rails and a cargo management unit slidably engaged with the set of rails. The cargo management unit is configured to engage with a package and move the package inside the delivery vehicle. The cargo management unit includes a gripping member that includes a lower claw and an upper claw. The lower claw and the upper claw are attached with each other via a pair of first line screws, and are configured to move along the pair of first line screws to secure the package. The cargo management unit further includes a second line screw configured to engage the gripping member (Continued)

with a first rail, and is configured to rotate the gripping member along a second line screw axis and move the gripping member vertically along the second line screw.

20 Claims, 8 Drawing Sheets

(51) Int. Cl.
    *B25J 9/00*     (2006.01)
    *B25J 15/00*     (2006.01)
    *B60P 1/00*     (2006.01)
    *B60P 1/54*     (2006.01)
    *B60P 3/00*     (2006.01)
    *B65G 1/04*     (2006.01)
    *B65G 47/90*     (2006.01)
    *B65G 43/00*     (2006.01)
    *B65G 43/08*     (2006.01)
    *G06K 17/00*     (2006.01)

(52) U.S. Cl.
    CPC ............... *B60P 1/00* (2013.01); *B60P 1/5438* (2013.01); *B60P 3/007* (2013.01); *B65G 1/0485* (2013.01); *B65G 47/90* (2013.01); *B65G 47/901* (2013.01); *B65G 47/905* (2013.01); *B65G 2203/0216* (2013.01); *B65G 2203/04* (2013.01)

(58) Field of Classification Search
    CPC ....... B60P 3/007; B65G 1/0485; B65G 47/90; B65G 47/901; B65G 47/905; B65G 2203/0216; B65G 2203/04
    See application file for complete search history.

(56) References Cited

U.S. PATENT DOCUMENTS

| | | |
|---|---|---|
| 10,589,417 B2 | 3/2020 | Bastian, II et al. |
| 2019/0270600 A1* | 9/2019 | Chen ................... B65G 47/905 |
| 2021/0295242 A1 | 9/2021 | Rathi et al. |

FOREIGN PATENT DOCUMENTS

| | | | |
|---|---|---|---|
| CN | 209905936 U | * | 1/2020 |
| WO | 2021252756 A1 | | 12/2021 |

* cited by examiner

SMART CLAW VEHICLE-BASED PACKAGE MANAGEMENT SYSTEM

TECHNICAL FIELD

The present disclosure relates to a system and method for delivering packages, and more particularly, to automated loading and unloading of packages in a delivery vehicle.

BACKGROUND

With the continued growth of internet-based commerce, online marketplaces are increasingly used to deliver goods to customers, which has resulted in operational challenges in supplying the goods to the customers.

E-commerce companies and/or their delivery partners use various conventional approaches to optimize the delivery process. For example, the delivery partners sort and load the packages into the delivery vehicle in a preset order based on the delivery route to improve delivery efficiency. In addition, some delivery partners use autonomous vehicles to maximize human resources.

Although the conventional approaches mentioned above may optimize some delivery processes, they are unable to mitigate all the delivery related challenges faced by e-commerce companies and/or their delivery partners. For example, package loading and unloading is still a manual process. Thus, there exists a need in the industry for an improved system and method for delivering packages, specifically for automating the process of package loading and unloading.

It is with respect to these and other considerations that the disclosure made herein is presented.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

FIGS. 2-3B depict an example cargo management unit that moves a package inside a delivery vehicle, in accordance with the present disclosure.

DETAILED DESCRIPTION

Overview

The present disclosure describes a delivery vehicle configured to autonomously load and unload packages. The delivery vehicle may include a cargo management unit configured and/or programmed to position and reposition a package from a vehicle cargo area, and update an onboard database of package identification and localization information. For example, the disclosed system can scan a code disposed on the package (such as a quick response code, via a scanner), uniquely identify the package using a package identifier, identify the onboard location of the package, and update the database to record a present package location.

For example, the cargo management unit may be further configured to transmit the package identifier associated with the code to a vehicle processor. The vehicle processor may be configured to receive the package identifier and fetch a loading plan for the package based on the package identifier. In particular, the vehicle processor may determine a loading position (e.g., a vehicle storage shelf) based on the loading plan, and may provide instructions to the cargo management unit to move the package from the vehicle receiving area to the loading position. In addition, the vehicle processor may fetch unloading plan for the package based on package delivery schedule, and may provide instructions to the cargo management unit to move the package from the loading position to a vehicle deliver area during package unloading process.

In some aspects, the delivery vehicle may include a set of rails to facilitate cargo management unit movement in the delivery vehicle. The set of rails may include a first rail and a pair of second rails. The first rail may be perpendicularly and slidably engaged with the pair of second rails. In some aspects, the cargo management unit may be slidably engaged with the first rail to move inside the delivery vehicle.

In some aspects, the cargo management unit may include a gripping member having a lower claw and an upper claw to secure the package. The lower claw and the upper claw may be attached via a pair of first line screws. In some aspects, the lower claw and the upper claw may be configured to move vertically relative to each other, along the pair of first line screws, to secure packages of different sizes.

In further aspects, the cargo management unit may include a second line screw to engage with the lower claw, the upper claw, and the first rail. In one or more aspects, the lower claw and the upper claw may be configured to rotate along a second line screw axis, and move vertically along the second line screw, which may facilitate a gripping member vertical movement.

In further aspects, the cargo management unit may include one or more motors configured to facilitate the cargo management unit movement, and the lower and upper claw vertical movement. In some aspects, the vehicle processor may actuate the one or more motors that cause the cargo management unit to reposition in the delivery vehicle during the package loading/unloading process.

The present disclosure discloses an apparatus that enables automatic loading and unloading of packages for delivery. In other words, the present disclosure describes a delivery system that may optimize the delivery process by increasing efficiency by reducing manual effort in loading and unloading the packages. Furthermore, since the apparatus performs automatic loading and unloading, the probability of mishandling of packages due to human negligence is reduced.

These and other advantages of the present disclosure are provided in detail herein.

Illustrative Embodiments

The disclosure will be described more fully hereinafter with reference to the accompanying drawings, in which example embodiments of the disclosure are shown, and not intended to be limiting.

Figure 1:
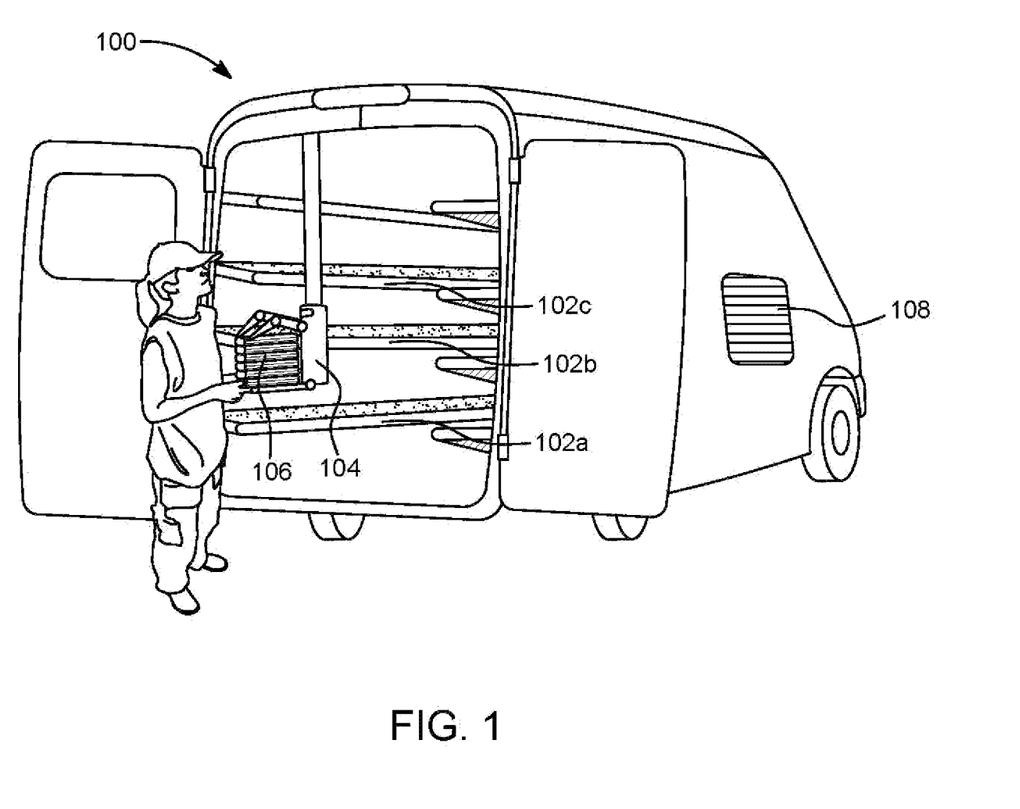
FIG. 1 depicts an example delivery vehicle in which techniques and structures for providing the systems and methods disclosed herein may be implemented.

FIG. 1 depicts an example delivery vehicle 100 in which techniques and structures for providing the systems and methods disclosed herein may be implemented. The delivery vehicle 100 may be, for example, a truck, a van (including walk-in vans), a truck trailer, and/or the like. In some aspects, the delivery vehicle 100 may be an autonomous vehicle. In other aspects, a driver/operator may operate the delivery vehicle 100.

The delivery vehicle 100 may include a plurality of shelves 102a, 102b, 102c (collectively referred to as a plurality of shelves 102), on which a plurality of delivery packages may be placed. The plurality of shelves 102 may be positioned in a stacked arrangement. In some aspects, the plurality of shelves 102 may include slots (not shown in FIG. 1) on which the packages may be loaded. The shelves' structural details may be understood in conjunction with FIGS. 5a, 5b.

In some aspects, the delivery vehicle 100 may include a cargo management unit 104 configured to engage with a package 106 and move the package 106 inside the delivery vehicle 100. In particular, the cargo management unit 104 may be configured to receive the package 106 from a first position/location (or a vehicle receiving area, for example, near a vehicle storage area gate). A user may place the package 106 at the first position, or an autonomous delivery apparatus (e.g., a delivery robot, not shown in FIG. 1) may place the package 106 at the first vehicle location.

In some aspects, the package 106 may include a label, for example, a quick response (QR) code, disposed on the package 106. A delivery operator (not shown in FIG. 1) may dispose the label on the package 106 before/while placing the package 106 at the first vehicle location, and the label may include package information. In some aspects, the package information may include information associated with the package weight, dimension, content (fragile or non-fragile), delivery address and/or delivery priority order. The cargo management unit 104 may be configured to read the label and identify the package information associated with the package 106.

The cargo management unit 104 may be configured to determine (via a vehicle processor) a second position (for example, the shelf 102a) and place the package 106 in the delivery vehicle 100 based on the package information. For example, the cargo management unit 104 may place the package 106 on the shelf 102a and near the vehicle storage area gate, when the cargo management unit 104 determines (based on the package information) that the package delivery address is a first address on a vehicle delivery route. Similarly, the cargo management unit 104 may place the package 106 in a top most shelf (e.g., the shelf 102c) when the cargo management unit 104 determines that the package 106 includes fragile content.

In some aspects, the cargo management unit 104 may be configured to move the package 106 from the first position (e.g., the vehicle storage area gate) to the determined second position (e.g., the shelf 102a). In other words, the cargo management unit 104 may be configured to autonomously load the package 106 inside the delivery vehicle 100 based on the package information.

In additional aspects, the cargo management unit 104 may be configured to unload the package 106 when (before) the delivery vehicle 100 reaches the package delivery address. For example, the cargo management unit 104 may be configured to move the package 106 from the shelf 102a to a delivery area 108, when (or before) the delivery vehicle 100 reaches the package delivery address. In some aspects, the delivery area 108 may be a delivery vehicle portion from where a customer/delivery client (not shown in FIG. 1) may collect the package 106. In other aspects, drones or other automated devices may perform the package last mile delivery. In such scenarios, a delivery drone may collect the package 106 from the delivery area 108, and deliver the package 106 to the customer. The cargo management unit details may be understood in conjunction with FIGS. 2 and 3.

Figure 2:
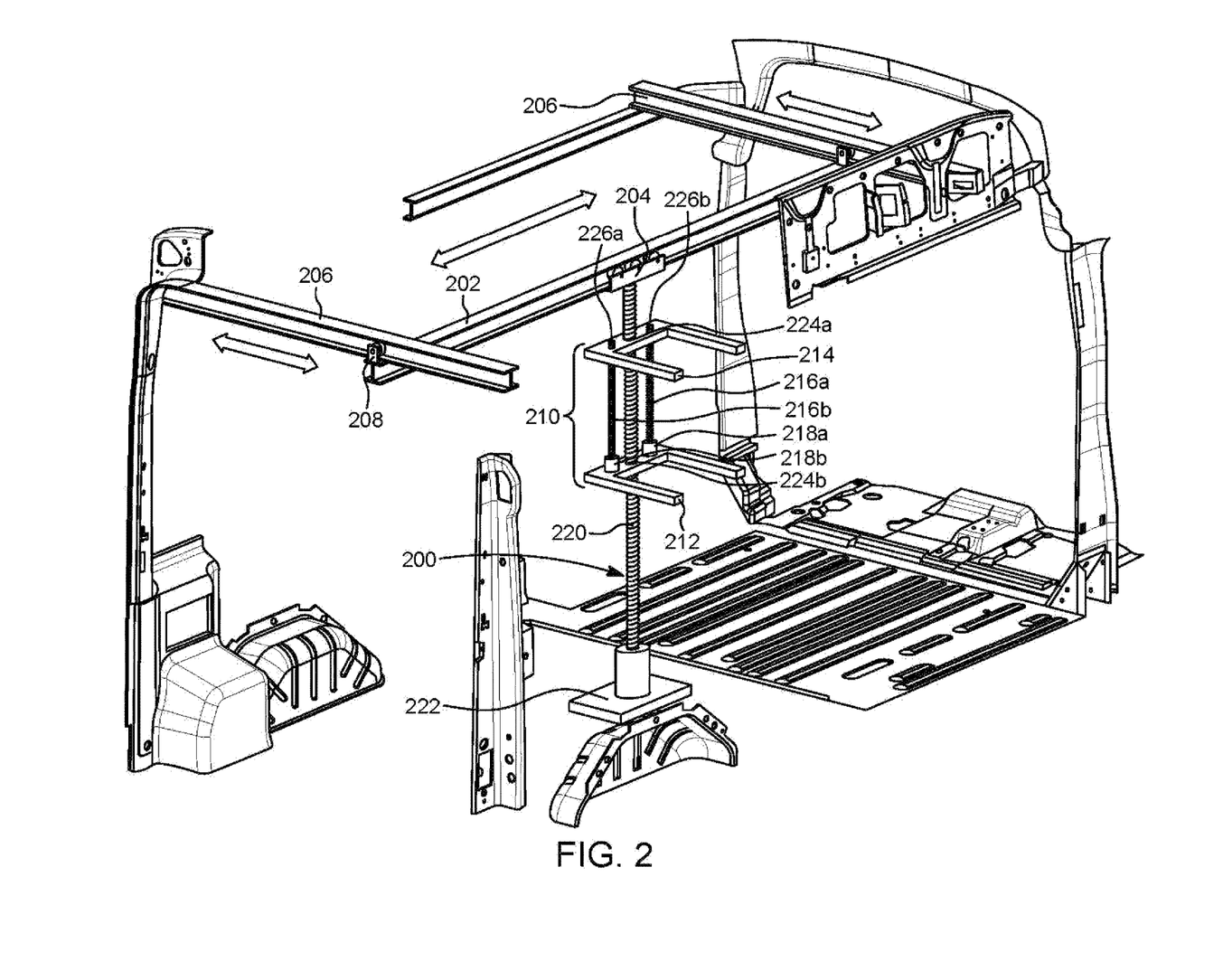
Figure 3A:
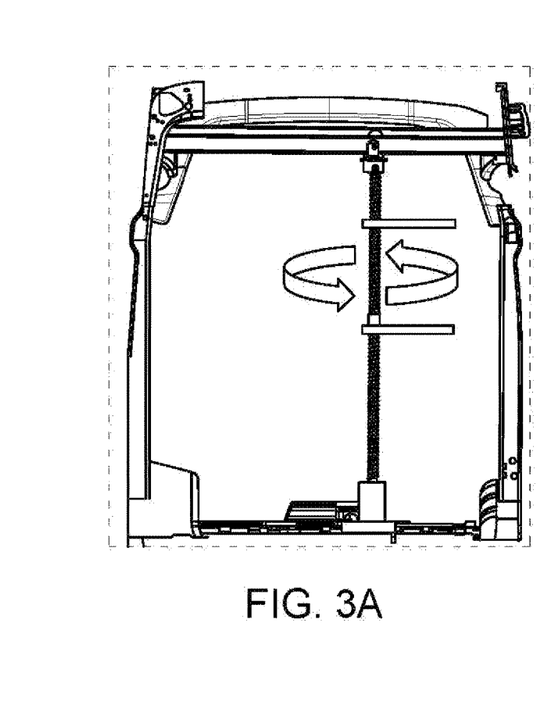
Figure 3B:
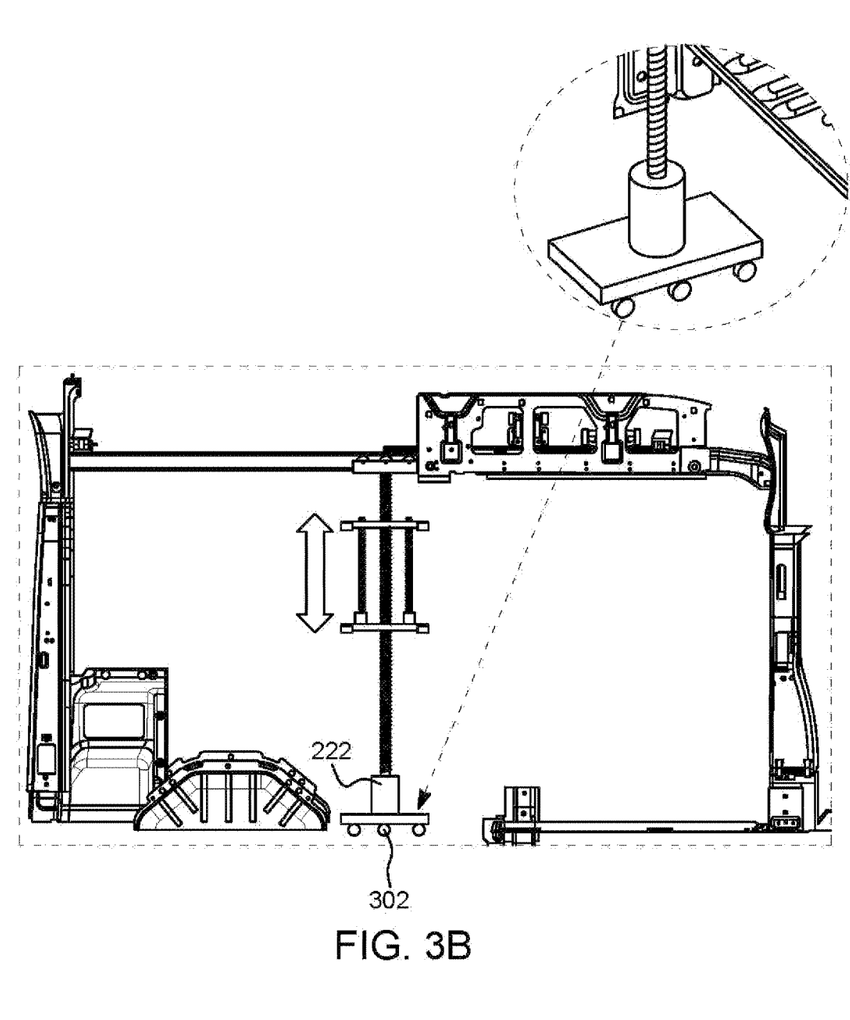

FIGS. 2 and 3 depict an example cargo management unit 200 that may move a package (not shown in FIGS. 2 and 3) inside a delivery vehicle (not shown in FIGS. 2 and 3), in accordance with the present disclosure. The cargo management unit 200 may slidably engage with a first rail 202 placed inside the delivery vehicle (specifically, inside a vehicle storage area). In some aspects, the first rail 202 may be placed near a vehicle ceiling portion and may be oriented along a vehicle length (e.g., from a rear to a front vehicle storage area portion). The cargo management unit 200 may slidably engage with the first rail 202 by using a first set of rollers 204. The first set of rollers 204 may enable the cargo management unit 200 to move along the vehicle length (e.g., from the rear to the front vehicle storage area portion).

In some aspects, the first rail 202 may slidably engage, in a perpendicular alignment, with a pair of second rails 206 attached inside the delivery vehicle. Specifically, the pair of second rails 206 may be attached to the vehicle ceiling portion, and may be placed along a vehicle width (e.g., from a right to a left vehicle storage area portion). Furthermore, the first rail 202 may slidably engage with the pair of second rails 206 by using a second set of rollers 208. Although the present example system is described as having a perpendicular alignment, other configurations are possible and contemplated as possible configurations of the present system.

In some aspects, the first rail 202 may enable forward and backward cargo management unit movement inside the delivery vehicle (via the first set of rollers 204), as indicated in FIG. 2. In further aspects, the pair of second rails 206 may enable first rail left and right movement, and consequently the cargo management unit left and right movement, inside the delivery vehicle, as indicated in FIG. 2. A person ordinarily skilled in the art may appreciate that the cargo management unit 200 may move along any portion of the vehicle storage area length and breadth by using the rail arrangement described above.

The cargo management unit 200 may further include a gripping member 210 configured to grab/hold the package (e.g., the package 106). The gripping member 210 may include a lower claw 212 and an upper claw 214, which are placed one over another (in parallel to each other). In some aspects, the lower claw 212 and the upper claw 214 may be closed at one end, and open at other end. In some aspects, the lower claw 212 and the upper claw 214 may have same shape, material, weight, dimensions, and/or the like.

In other aspects, the lower claw 212 and the upper claw 214 may have different shapes, materials, weight, dimensions, and/or the like. For instance, the lower claw 212 and the upper claw 214 may be of any shape including, but not limited to, "U-shaped", "C-shaped", and the like. Alternatively, the upper claw 214 may be "V-shaped" having a connector at joint, and the lower claw 212 may be straight "U-shaped". Further, the lower claw 212 and the upper claw 214 may be made of wood, plastic, stainless steel, aluminum, titanium, and/or other metals/material.

In accordance with some aspects, the lower claw 212 and the upper claw 214 may couple with each other via a pair of first line screws 216a and 216b. In some aspects, the lower claw 212 and the upper claw 214 may include a pair of holes 226a, 226b to engage with the pair of first line screws 216a, 216b. The lower claw 212 and the upper claw 214 may be configured to move with respect to each other (e.g., up or down to be closer or far from each other) and engage with the package, via the pair of first line screws 216a, 216b. In other aspects, the lower claw 212 and the upper claw 214 may be coupled together via other mechanisms including, but not limited to, chain and gear mechanism, cable winding mechanism, hydraulic gripping mechanism, etc., which may allow movement of the lower claw 212 and/or upper claw 214. In some aspects, the lower claw 212 or the upper claw 214 may move up or down and secure (e.g., grab or hold) the package. In other aspects, both the lower claw 212 and the upper claw 214 may move up or down and secure the package, along a first line screw axis.

In some aspects, the gripping member 210 may include one or more motors 218a, 218b configured to move the lower claw 212 and the upper claw 214 up or down. The motors 218a, 218b may be, for example, stepper motors, servo motors, or another actuation means, and may enable first line screws' rotation and move the lower claw 212 and the upper claw 214 up or down. In particular, a vehicle processor (not shown in FIGS. 2 and 3) may actuate the motors 218a, 218b to move the lower claw 212 and the upper claw 214 up or down, based on a package dimension/size (and securely hold the package). The motors 218a, 218b actuation details may be understood in conjunction with FIG. 4.

In accordance with further aspects, the cargo management unit 200 may include a second line screw 220, a line screw drive base 222, and a third set of rollers 302. The line screw drive base 222 may be attached to a second line screw bottom (as shown in FIG. 3a) and may be placed on a delivery vehicle base surface. The second line screw 220 may attach to the first set of rollers 204, the gripping member 210, and the line screw drive base 222, as shown in FIG. 2. In some aspects, the second line screw 220 may attach to the lower claw 212 and the upper claw 214 through a pair of holes 224a, 224b placed at lower claw and upper claw centers. Furthermore, the second line screw 220 may be parallel to the pair of first line screws 216a and 216b, as shown in FIG. 2.

In some aspects, the third set of rollers 302 may be configured to enable cargo management unit movement inside the delivery vehicle storage area. For example, the third set of rollers 302 may enable cargo management unit linear movement (such as forward, backward, left side, and/or right side, via the first rail 202 and the pair of second rails 206) and/or rotational movement (e.g., clockwise or anti-clockwise movement) along the second line screw axis. In one or more aspects, a second motor (not shown in FIGS. 2 and 3) installed in/attached to the line screw drive base 222 may actuate the third set of rollers 302, and enable the cargo management unit movement inside the delivery vehicle storage area. In other words, the line screw drive base 222 may include the second motor that may actuate the third set of rollers 302 and move the cargo management unit (including the gripping member 210) forward, backward, left side, and/or right side inside the delivery vehicle storage area, via the first rail 202 and the pair of second rails 206. In some aspects, the line screw drive base 222 may provide a robust and stable base to the cargo management unit, which may enable the weight of the packages placed in the gripping member 210 to be evenly distributed with the first rail 202, the pair of second rails 206 and the line screw drive base 222.

In some aspects, the second line screw 220 may attach to the gripping member 210 (specifically to the lower claw 212 and the upper claw 214) in an arrangement such that the lower claw and the upper claw alignment with respect to the line screw drive base 222 may be fixed. In other words, the lower claw 212 and the upper claw 214 may move or rotate along with the line screw drive base 222 (e.g., when the third set of rollers 302 move or rotate), and may not change their alignment with respect to the line screw drive base 222. In some aspects, the second line screw 220 may attach to the lower claw 212 and the upper claw 214 by using an actuator/stopper (not shown in FIGS. 2 and 3) that may restrict the lower claw and the upper claw movement relative to the line screw drive base 222.

In further aspects, a second line screw rotational movement along its axis may enable upward or downward gripping member movement, as shown in FIG. 3b. In particular, to move the gripping member 210 up or down along the second line screw 220, the second motor may keep the third set of rollers 302 or the line screw drive base 222 fixed (e.g., not enable their movement), and may enable the second line screw 220 clockwise or anti-clockwise rotation. Since the gripping member 210 alignment with respect to the line screw drive base 222 is fixed, the second line screw rotational movement causes the gripping member 210 to move up or down. The gripping member 210 upward and downward movement facilitates loading or unloading of packages placed at lower or upper vehicle storage area shelves (e.g., the shelf 102a and the shelf 102c).

A person ordinarily skilled in the art may appreciate that the cargo management unit 200 arrangement, as disclosed in the present disclosure, may enable autonomous loading or unloading of packages placed at different vehicle storage area shelves (e.g., lower, upper, left or right shelves). Furthermore, the gripping member 210 arrangement may enable holding/securing of different package sizes during the package loading/unloading process. The package loading and unloading details may be understood in conjunction with FIGS. 6-8.

Figure 4:
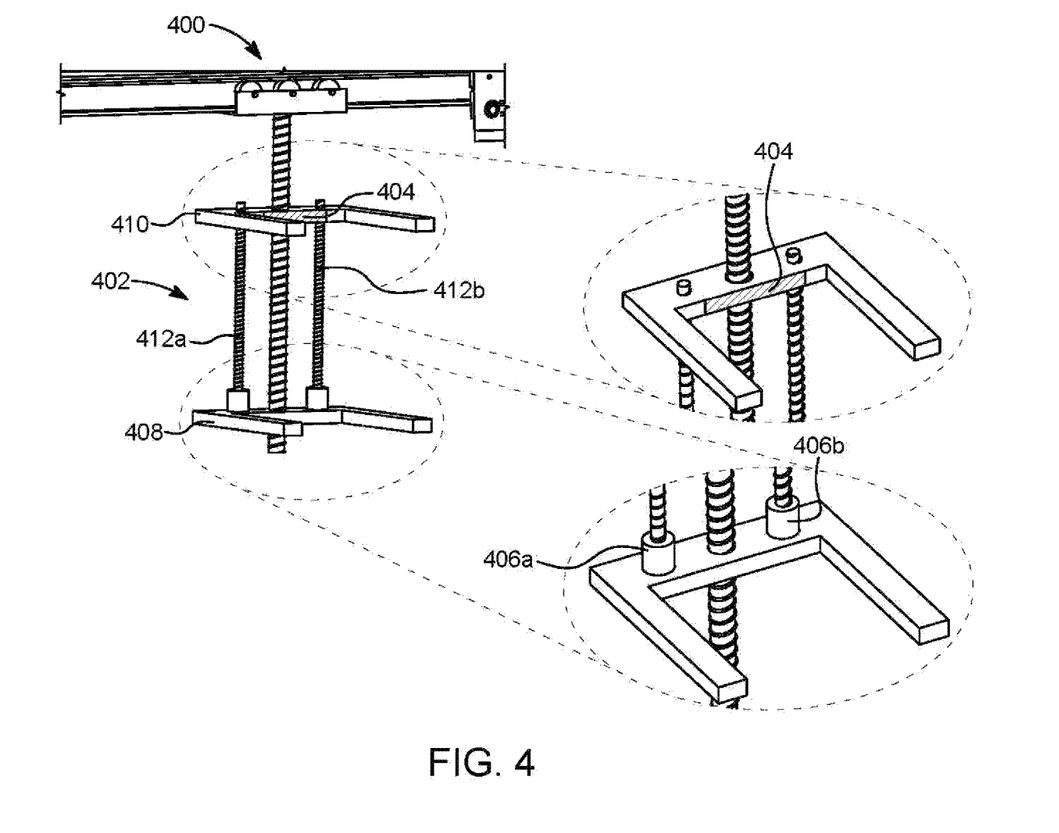
FIG. 4 depicts a portion of a cargo management unit in accordance with the present disclosure.

FIG. 4 depicts a portion of a cargo management unit 400, in accordance with the present disclosure. The cargo management unit 400 may be same as the cargo management unit 200.

In some aspects, the cargo management unit 400 may include a gripping member 402. The gripping member 402 may include a reader 404 that may scan markers/labels disposed on a package, such as a quick response (QR) code, and obtain/fetch package information. As described above, the package information may include package weight, dimensions, and delivery address. The reader 404 may include, but is not limited to, a Charge-Couple Device (CCD) scanner, an image scanner, a laser scanner, and the like. A delivery vehicle processor (not shown in FIG. 4) may use the package information to determine (or fetch) loading and/or unloading plan associated with the package. The loading and unloading plan details may be understood in conjunction with FIGS. 6-8.

As discussed above, the gripping member 402 may include one or more motors 406*a*, 406*b* (same as the one or more motors 218*a*, 218*b*) configured to move a lower claw 408 and an upper claw 410 up and down, via a pair of line screws 412*a*, 412*b*. In one or more aspects, the motors 406*a*, 406*b* may be stepper motors. In particular, the delivery vehicle processor may actuate the motors 406*a*, 406*b* to move the lower claw 408 and the upper claw 410 up or down, with respect to each other. In particular, the reader 404 may be configured to read the package information (including the package dimensions, e.g., length, height, width) and send the information to the delivery vehicle processor. Responsive to the package information receipt, the delivery vehicle processor may actuate the motors 406*a*, 406*b*, based on the package information. For instance, when the package information indicates that a package height is 30 cm, the delivery vehicle processor may actuate the motors 406*a*, 406*b* to move the lower claw 408 and/or the upper claw 410 up or down, so that the claws can securely hold the package of 30 cm. Thus, the gripping member 402 may be configured to hold packages of different dimensions.

Figure 5A:
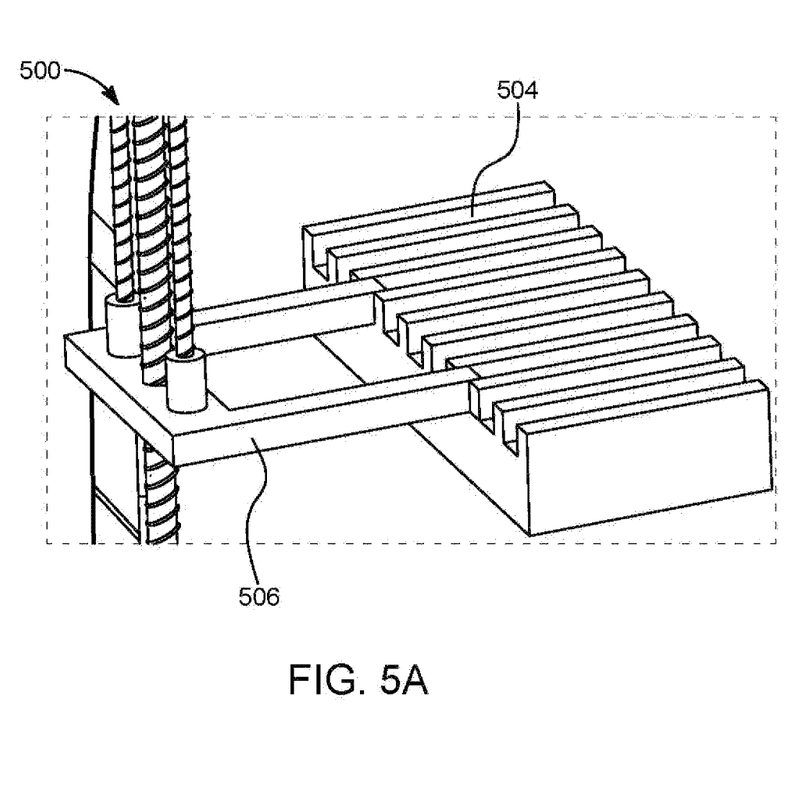
FIGS. 5A and 5B depict a cargo management unit positioning a package on a shelf located inside a delivery vehicle, in accordance with the present disclosure.
Figure 5B:
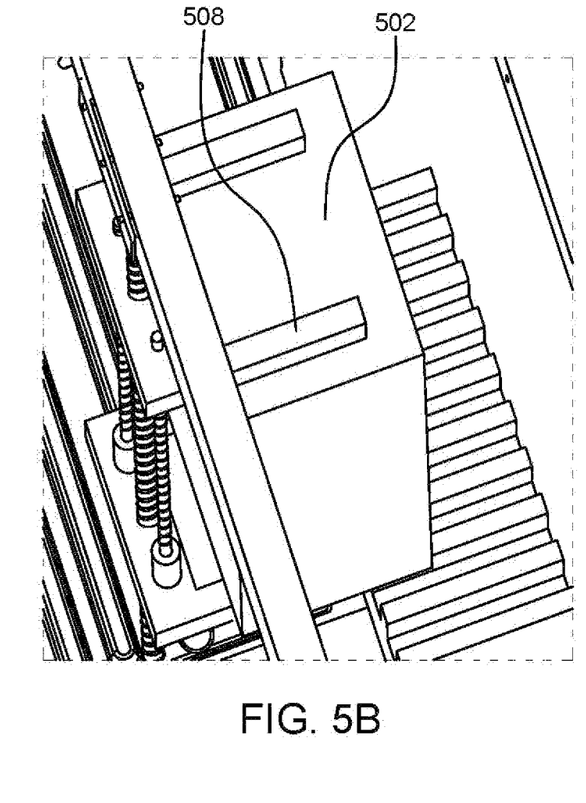

FIGS. 5*a* and 5*b* depict a cargo management unit 500 positioning a package 502 on a shelf located inside a delivery vehicle (e.g., the delivery vehicle 100, not shown in FIGS. 5*a*, 5*b*), in accordance with the present disclosure. As discussed above, the delivery vehicle 100 may include a plurality of shelves (e.g., the plurality of shelves 102) on which delivery packages may be placed. The plurality of shelves may be positioned in a stacked arrangement. In some aspects, each shelf may include a plurality of slots 504. In one or more aspects, the plurality of slots 504 may be present at a shelf portion. In other aspects, the plurality of slots 504 may be present throughout a shelf length. In further aspects, the slots may be cut vertically or in any other shape corresponding to the cargo management unit 500 type and size (specifically a lower claw 506 size).

In some aspects, the size of each slot may be same or different with respect to each other. In one or more aspects, the shape and size of each slot corresponds to a gripping member shape and size (specifically the lower claw 506 shape and size), which allows the lower claw 506 to be inserted inside the slots to place or position the package 502 on the shelf (e.g., for loading the package 502). Additionally, the lower claw 506 may be inserted inside the slots to pick the package 502 from the shelf (e.g., for unloading the package 502).

In operation, the delivery vehicle processor (not shown in FIGS. 5*a*, 5*b*) may actuate the gripping member to hold/grab the package 502 between the lower claw 506 and an upper claw 508, and load the package 502 on the shelf. Responsive to the package holding, the gripping member may insert the lower claw 506 inside the slots, and place the package 502 on the shelf. In some aspects, the gripping member may then move (via the one or more motors described above) the lower claw 506 downward when the lower claw 506 is inserted in the slots, and move the lower claw 506 out from the slots to securely load the package 502 on the shelf. Similarly, at the time of unloading the package 502, the gripping member may insert the lower claw 506 in the slots, and move (via the one or more motors) the lower claw 506 upwards and pick the package 502 from the shelf. In some aspects, the gripping member may then transfer the package 502 to a vehicle delivery area (e.g., delivery area 108).

A person ordinarily skilled in the art may appreciate that the slots in the delivery vehicle shelves prevent slippage of packages inside the delivery vehicle. In addition, the slots enable autonomous package loading and unloading via the cargo management unit 500. In this way, the cargo management unit 500 may load/unload the package 502 automatically, without any manual intervention.

Figure 6:
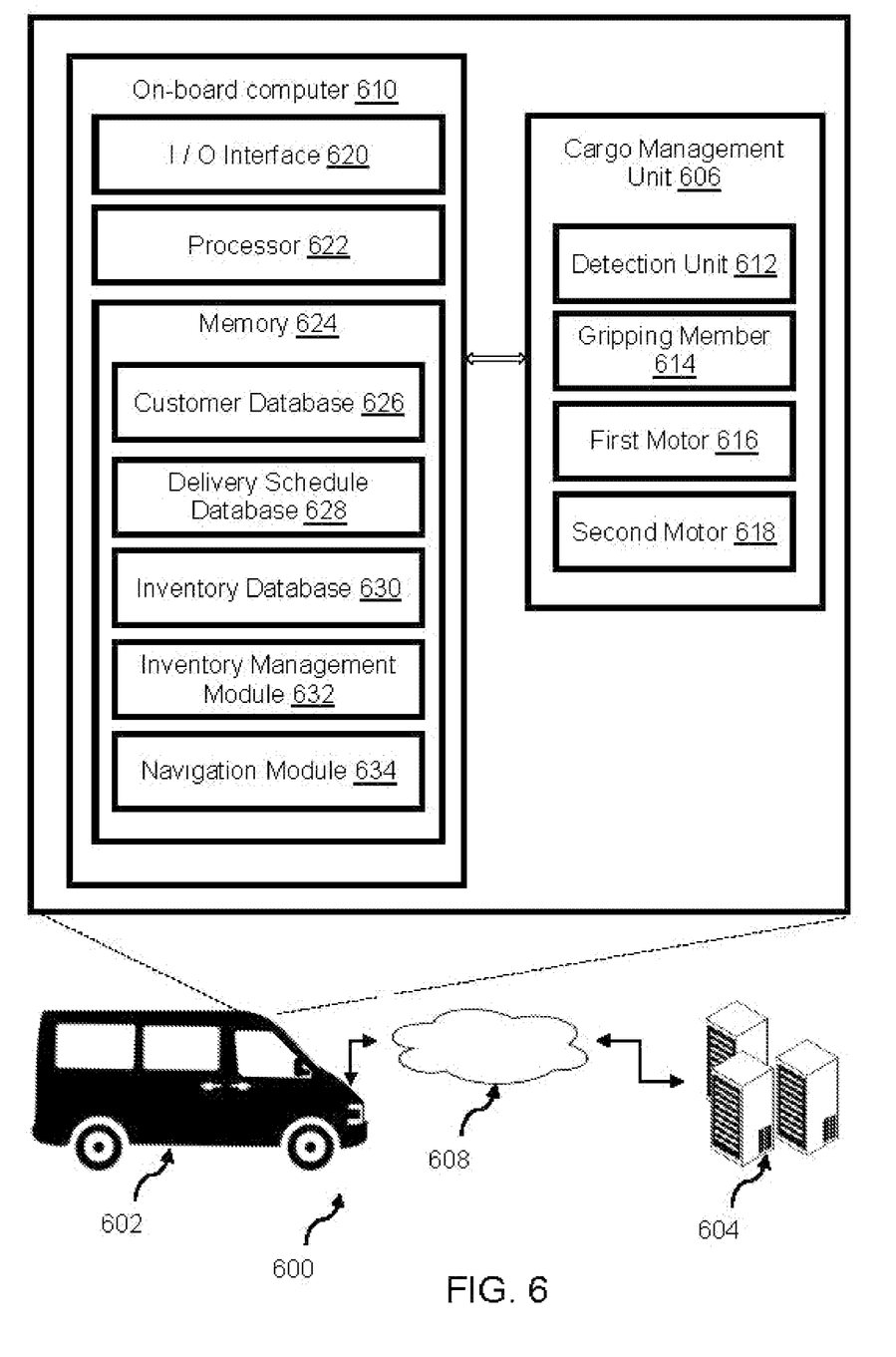
FIG. 6 illustrates a block diagram of an example delivery management system for delivering packages, in accordance with the present disclosure

FIG. 6 illustrates a block diagram of an example delivery management system 600 for delivering packages, in accordance with the present disclosure. The delivery management system 600, as described herein, can be implemented in hardware, software (e.g., firmware), or a combination thereof. The delivery management system 600 may include a delivery vehicle 602 and one or more servers 604 (or a server 604), which may be communicatively coupled to each other via one or more networks 608 (or a network 608). In some aspects, the delivery vehicle 602 may be same as the delivery vehicle 100 and may be configured to deliver packages to customers.

The network 608 may be, for example, a communication infrastructure in which the connected devices discussed in various embodiments of this disclosure may communicate. The network 608 may be and/or include the Internet, a private network, public network or other configuration that operates using any one or more known communication protocols such as, for example, transmission control protocol/Internet protocol (TCP/IP), Bluetooth®, BLE®, Wi-Fi based on the Institute of Electrical and Electronics Engineers (IEEE) standard 802.11, UWB, and cellular technologies such as Time Division Multiple Access (TDMA), Code Division Multiple Access (CDMA), High Speed Packet Access (HSPDA), Long-Term Evolution (LTE), Global System for Mobile Communications (GSM), and Fifth Generation (5G), to name a few examples.

In some aspects, the delivery vehicle 602 may include a cargo management unit 606 and an on-board computer 610. The cargo management unit 606 may be same as/similar to the cargo management unit 200. The cargo management unit 606 may include, for example, a detection unit 612 (e.g., a QR code reader 612), a gripping member 614 (same as the gripping member 210), a first motor 616 (same as the motors 218*a*, 218*b*), and a second motor 618. In some aspects, the first motor 616 may be configured to move gripping member claws (e.g., an upper claw and/or a lower claw) up or down relative to each other, to securely hold packages of different sizes. The second motor 618 may be configured to move the cargo management unit 606 inside the delivery vehicle 602, for example, from one vehicle shelf to another, to load/unload packages in the delivery vehicle 602. In addition, the second motor 618 may be configured to rotate a cargo management unit line screw (e.g., the second line screw 220) to cause upward or downward gripping member movement. The movement of the cargo management unit, the gripping member and its claws, is already described above in conjunction with FIGS. 2-4.

The cargo management unit 606 may include additional elements, for example, a first rail, a pair of second rails, rollers, line screws, line screw drive base, and the like, as described in conjunction with FIGS. 2 and 3. For the sake of simplicity, the additional elements are not shown and described again in FIG. 6.

In some aspects, the on-board computer 610 may be configured to communicate with the server 604 via the network 608. The server 604 may be part of a cloud-based computing infrastructure and may be associated with and/or include a Telematics Service Delivery Network (SDN) that provides digital data services to the delivery vehicle 602 and other vehicles (not shown in FIG. 6), that may be part of a vehicle fleet.

In some aspects, the on-board computer 610 may include a plurality of components including, but not limited to, an Input/Output (I/O) interface 620, a processor 622, and a memory 624, which are communicatively coupled to each other. The memory 624 may store programs in code and/or store data for performing various on-board computer 610 operations in accordance with the present disclosure. Specifically, the processor 622 may be configured and/or programmed to execute computer-executable instructions stored in the memory 624 for performing various on-board computer functions in accordance with the disclosure. Consequently, the memory 624 may be used for storing code and/or data code and/or data for performing operations in accordance with the present disclosure.

In one or more aspects, the processor 622 may be disposed in communication with one or more memory devices (e.g., the memory 624 and/or one or more external databases (not shown in FIG. 6)). The memory 624 can include any one or a combination of volatile memory elements (e.g., dynamic random-access memory (DRAM), synchronous dynamic random access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.).

The memory 624 may be one example of a non-transitory computer-readable medium and may be used to store programs in code and/or to store data for performing various operations in accordance with the disclosure. The instructions in the memory 624 can include one or more separate programs, each of which can include an ordered listing of computer-executable instructions for implementing logical functions.

In some aspects, the memory 624 may store a plurality of information/dataset in one or more databases. Examples of such databases include, but are not limited to, a customer database 626, a delivery schedule database 628, and an inventory database 630. In addition, the memory 624 may include one or more modules to facilitate the on-board computer 610 operation. Examples of such modules include, but are not limited to, an inventory management module 632 and a navigation module 634.

In some aspects, the I/O interface 620 may be configured to receive a plurality of customer information associated with the packages to be delivered by the delivery vehicle 602. For example, the customer information may include, for each delivery package, a customer name, a customer address, customer contact details, any special instructions from the customer, and/or the like. In one aspect, the I/O interface 620 may receive the plurality of customer information from an external database/server, which pre-stores such information for all the customers and the corresponding packages. For example, the I/O interface 620 may receive the plurality of customer information from the server 604, before the delivery vehicle 602 commences the delivery route/schedule. In some aspects, the server 604 may be associated with an e-commerce service provider that may receive the plurality of customer information from the e-commerce customers.

In some aspects, the customer database 626 may store the received plurality of customer information when the I/O interface 620 receives the information from the server 604.

The I/O interface 620 may be further configured to receive package delivery schedule associated with the packages to be delivered via the delivery vehicle 602. The delivery schedule may include, but is not limited to, a package delivery sequence for the packages present in the delivery vehicle 602, a date and time for each package delivery, and/or the like. Like the plurality of customer information, the I/O interface 620 may receive the package delivery schedule from an external database/server (e.g., the server 604).

In some aspects, the delivery schedule database 628 may store the received package delivery schedule, when the I/O interface 620 receives it.

The I/O interface 620 may be further configured to receive a plurality of information associated with an inventory (e.g., packages) loaded in the delivery vehicle 602. The inventory information may include, for example, for each package, a package identifier, a package size/dimension, a package weight, a packet shape, a package delivery address, and/or the like. In some aspects, the inventory information may further include a mapping of each package (e.g., via the package identifier) with a respective loading and unloading plan in the delivery vehicle 602. The package loading plan may be based on the package information (package size/dimension, package weight, and packet shape) and the delivery address and/or schedule for each package. For example, for a package with a delivery schedule that is first in the delivery vehicle 602 route, the package loading plan may include instructions to load the package on a vehicle shelf that is close to a vehicle delivery area (e.g., the delivery area 108). Similarly, the package unloading plan may be based on the delivery address and/or schedule for each package.

Similar to the earlier aspects, the I/O interface 620 may receive the plurality of information associated with the inventory from an external database (e.g., the server 604). Further, the inventory database 630 may store the inventory information, when the I/O interface 620 receives it.

In accordance with further aspects, the inventory database 630 may update the information stored therein, as and when the delivery vehicle 602 delivers the packages on the delivery route. In other words, the inventory database 630 may store the current (and updated) delivery status of each package.

In some aspects, the I/O interface 620 may be further configured to receive a delivery route to deliver the packages loaded in the delivery vehicle. In some aspects, an external database or the server 604 may send the delivery route to the I/O interface 620. In one or more aspects, the external database/server 604 may use the package delivery schedule and the inventory information (including the package delivery address) and determine the delivery route. The delivery route may be, for example, a shortest route to deliver all the packages in the delivery vehicle 602, or a route with minimum travel time.

In some aspects, the navigation module 634 may store the delivery route, when the I/O interface 620 receives it. The delivery vehicle 602 may use the delivery route stored in the navigation module 634 during transit, when the delivery vehicle 602 delivers the packages.

In operation, a loading client (e.g., a delivery vehicle operator or a loading robot) may place a package in a vehicle receiving area (not shown in FIG. 6) to load the package in the delivery vehicle 602. The vehicle receiving area may be located near a vehicle storage unit gate. In some aspects, the receiving area may include a tray (not shown in FIG. 6) on which the loading client may place the package. In one or more aspects, the tray may include slots (like slots on shelves, as discussed above in conjunction with FIGS. 5a, 5b). In further aspects, the receiving area may include a sensor (e.g., a weight sensor) that detects whether a package is placed on the receiving area.

In some aspects, the I/O interface 620 may be configured to receive an input/signal associated with the receiving area (e.g., from the weight sensor), when the package is placed on the receiving area. In particular, the I/O interface 620 may receive an indication from the sensor that the loading client has placed a package on the receiving area. Responsive to the indication receipt, the I/O interface 620 may transmit the indication to the processor 622. The processor 622 may then transmit an instruction, via the inventory management module 632, to the cargo management unit 606 to scan a label/QR code disposed on the package that is placed on the receiving area.

Responsive to receiving the instruction from the processor 622, the detection unit 612 may scan the package label, and send the scan information (e.g., the package identifier) back to the processor 622. In some aspects, as described in conjunction with FIG. 4, the detection unit 612 (e.g., the QR code scanner) may be installed on the gripping member 614.

Responsive to receiving the scan information (specifically the package identifier), the processor 622 may obtain/fetch the package information, associated with the package identifier, from the inventory database 630. Specifically, the processor 622 may obtain a package size, a package loading/unloading plan, a package delivery address, and the like, from the inventory database 630.

In some aspects, the processor 622 may be configured to determine the package loading/unloading plan, based on the package delivery address and the package delivery schedule, when the inventory database 630 does not include/store the package loading/unloading plan (e.g., when the server 604 does not send the package loading/unloading plan to the I/O interface 620). In this case, along with obtaining the package information from the inventory database 630, the processor 622 may obtain the package delivery schedule from the delivery schedule database 628, and determine the package loading/unloading plan.

In some aspects, the package loading plan may include a loading position (such as a delivery vehicle shelf, as described above) on which the package is to be placed in the delivery vehicle 602. Responsive to obtaining/determining the package loading and unloading plan, the processor 622 may obtain the package loading position. In some aspects, the processor 622 may then transmit, via the inventory management module 632, a loading movement instruction to the cargo management unit 606 to actuate the cargo management unit 606 and move the package from the receiving area to the loading position.

In some aspects, along with the loading movement instructions, the processor 622 may also transmit package hold instructions to the cargo management unit 606, and move the gripping member claws (up or down) such that the gripping member 614 securely holds the package. The processor 622 may transmit the package hold instructions, for example, based on the package size/dimensions (as identified from the package information obtained from the inventory database 630).

Responsive to receiving the package hold instructions, the first motor 616 may actuate the gripping member claw movement (up or down) to securely hold the package at the vehicle receiving area. Furthermore, responsive to receiving the loading movement instructions, the second motor 618 may move and rotate (e.g., actuate) the cargo management unit 606 that moves the package from the receiving area to the loading position. In addition, the second motor 618 may actuate the gripping member 614 movement upwards or downwards, based on whether the loading position is on a lower vehicle shelf or an upper vehicle shelf. In some aspects, the cargo management unit and/or gripping member movement may be calculated and modelled by using known kinematics models or parameters, e.g., by using Denavit-Hartenberg (or DH) parameters.

While on the delivery route, in some aspects, the navigation module 634 may send an input/signal to the processor 622 when the package delivery address is arriving. In one or more aspects, the input/signal may include the package identifier. Responsive to receiving the input/signal from the navigation module 634, the processor 622 may obtain, via the inventory database 630, the package unloading plan by using the package identifier. The processor 622 may then transmit an unloading movement instruction and the package hold instructions, via the inventory management module 632, to the cargo management unit 606 based on the package unloading plan. In some aspects, the unloading movement instruction may include the loading location (e.g., the shelf where the package is placed), a delivery area location (e.g., the delivery area 108), and instructions to move the package from the loading location to the delivery area location. Responsive to receiving the unloading movement instructions and the package hold instructions, the first motor 616 and the second motor 618 may actuate the gripping member claw, the gripping member 614 and the cargo management unit 606 movements, which causes package movement from the loading location to the delivery area location. Movements during the package unloading process may be same as the movements during the package loading process, described above.

In some aspects, responsive to receiving the input/signal from the navigation module 634, the processor 622 may additionally transmit a notification to a package customer, notifying the customer that the package is arriving (so that the customer may be ready to pick the delivery from the delivery area location). The processor 622 may transmit the notification via the I/O interface 620 and may transmit the notification to a customer device (e.g., a mobile phone, not shown in FIG. 6). In some aspects, the processor 622 may obtain/fetch the customer contact details from the customer database 626. Responsive to receiving the notification, the customer may pick the package from the delivery area location.

In a scenario when the customer is not available to pick the package (e.g., when the customer is away from the package delivery location), the customer may send, via the customer device, a notification/input back to the processor 622 indicating the customer unavailability. In this case, the processor 622 may instruct the cargo management unit 606 to move the package back to the loading location. Alternatively, the processor may not instruct the cargo management unit 606 to move the package from the loading location to the delivery area location, when the processor 622 receives the customer unavailability notification before the cargo management unit 606 moves the package from the loading location to the delivery area location.

Figure 7:
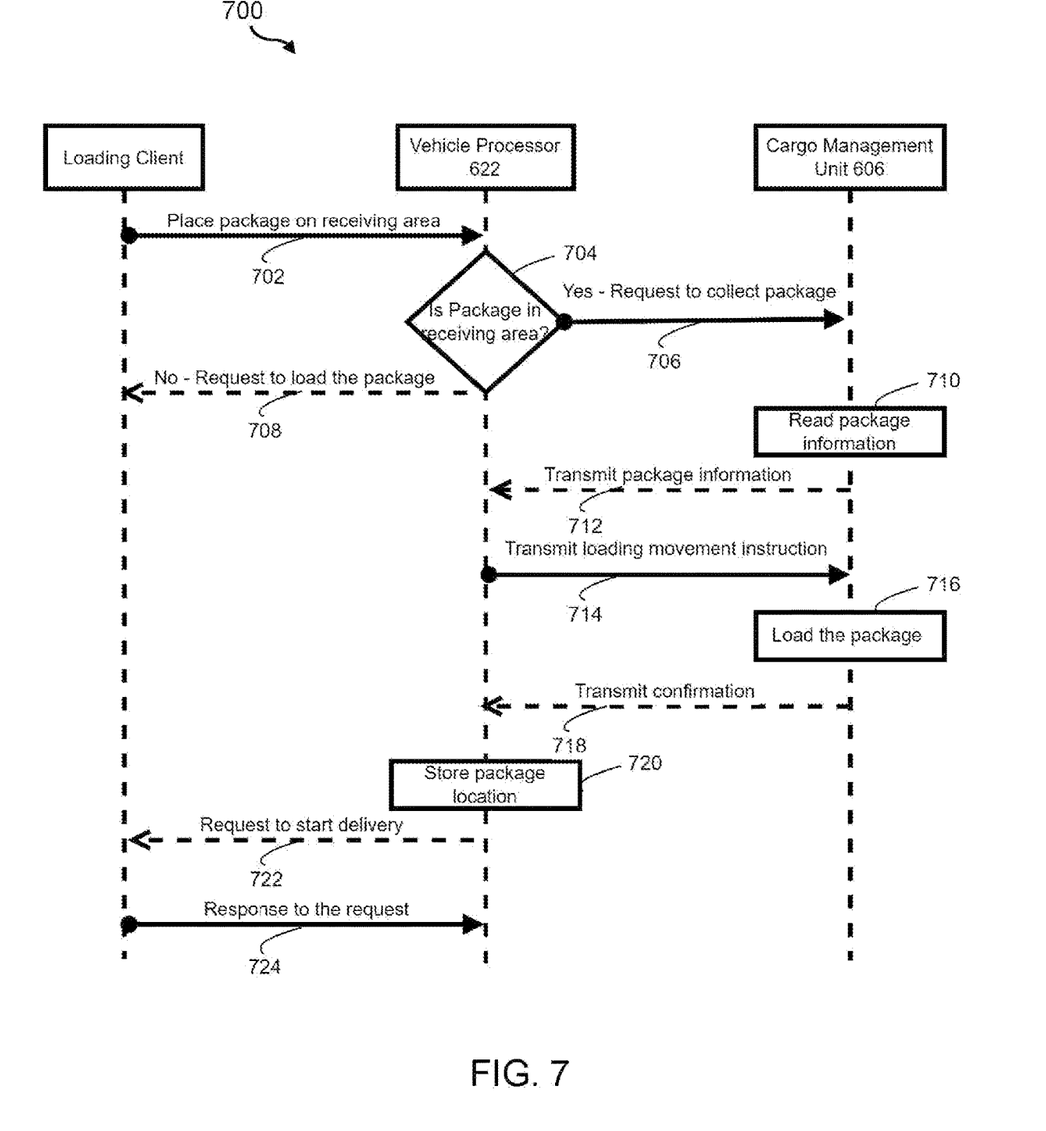
FIG. 7 depicts a sequential diagram of an example method for loading packages in a delivery vehicle, in accordance with the present disclosure.

FIG. 7 depicts a sequential diagram of an example method 700 for loading packages in a delivery vehicle, in accordance with the present disclosure. In particular, the method 700 describes a process of loading packages inside a delivery vehicle (such as the delivery vehicle 602). FIG. 7 may be described with continued reference to prior figures, including FIGS. 1-6. The following process is exemplary and not confined to the steps described hereafter. Moreover, alternative embodiments may include more or less steps that are shown or described herein and may include these steps in a different order than the order described in the following example embodiments.

At step 702, a loading client may place a package, to be loaded in the delivery vehicle 602, on a vehicle receiving area. In some aspects, the loading client may a drone, any other robotic device/vehicle, or a person. In further aspects, the receiving area may be located near a vehicle storage unit gate. In some aspects, the vehicle receiving area may include a tray on which the package may be placed. The tray may include slots and/or sensor, as described above.

At step 704, the vehicle processor 622 may determine whether the package is present/placed on the receiving area (e.g., by using inputs from a tray sensor). Responsive to a determination that the package is placed in the receiving area, the vehicle processor 622 may request (or actuate) the cargo management unit 606 to load the package inside the delivery vehicle 602, at step 706. Alternatively, responsive to a determination that the package is not placed on the receiving area, the vehicle processor 622 may request the loading client to load a package, at step 708. The request may be in the form of an audio or a video message that may be played on a delivery vehicle infotainment system (not shown).

In further aspects, at step 710, the cargo management unit 606 may move to the receiving area and read the package information (via a QR code scanner). The package information details may be understood in conjunction with the description of previous figures.

At step 712, the cargo management unit 606 may transmit the package information to the vehicle processor 622. Responsive to receiving the package information, the vehicle processor 622 may obtain/determine a loading plan corresponding to the package based on the package information. At step 714, the vehicle processor 622 may transmit loading movement instructions to the cargo management unit 606, as described in FIG. 6. In some aspects, the loading movement instructions may include a loading location (such as a delivery vehicle shelf), and/or instructions to reach to the loading location. In addition, the vehicle processor 622 may transmit package hold instructions, based on the package dimensions, which enables the cargo management unit 606 to securely hold the package.

At step 716, the cargo management unit 606 may move the package from the receiving area to the loading location based on the loading movement instructions, and place the package at the loading location.

At step 718, the cargo management unit 606 may transmit a confirmation notification, after placing the package at the loading location, to the vehicle processor 622. In some aspects, the confirmation notification may include exact/precise package loading location (such as coordinates). Responsive to receiving the confirmation notification, the vehicle processor 622 may store a loading location information corresponding to the package in the memory 624, at step 720.

At step 722, the vehicle processor 622 may request the loading client to confirm if the delivery vehicle 602 can start package delivery process. At step 722, the loading client may provide a response to the request. In some aspects, the loading client may grant permission to initiate the delivery process. In other aspects, the loading client may request the vehicle processor 622 to wait, as the loading client might load more packages.

Figure 8:
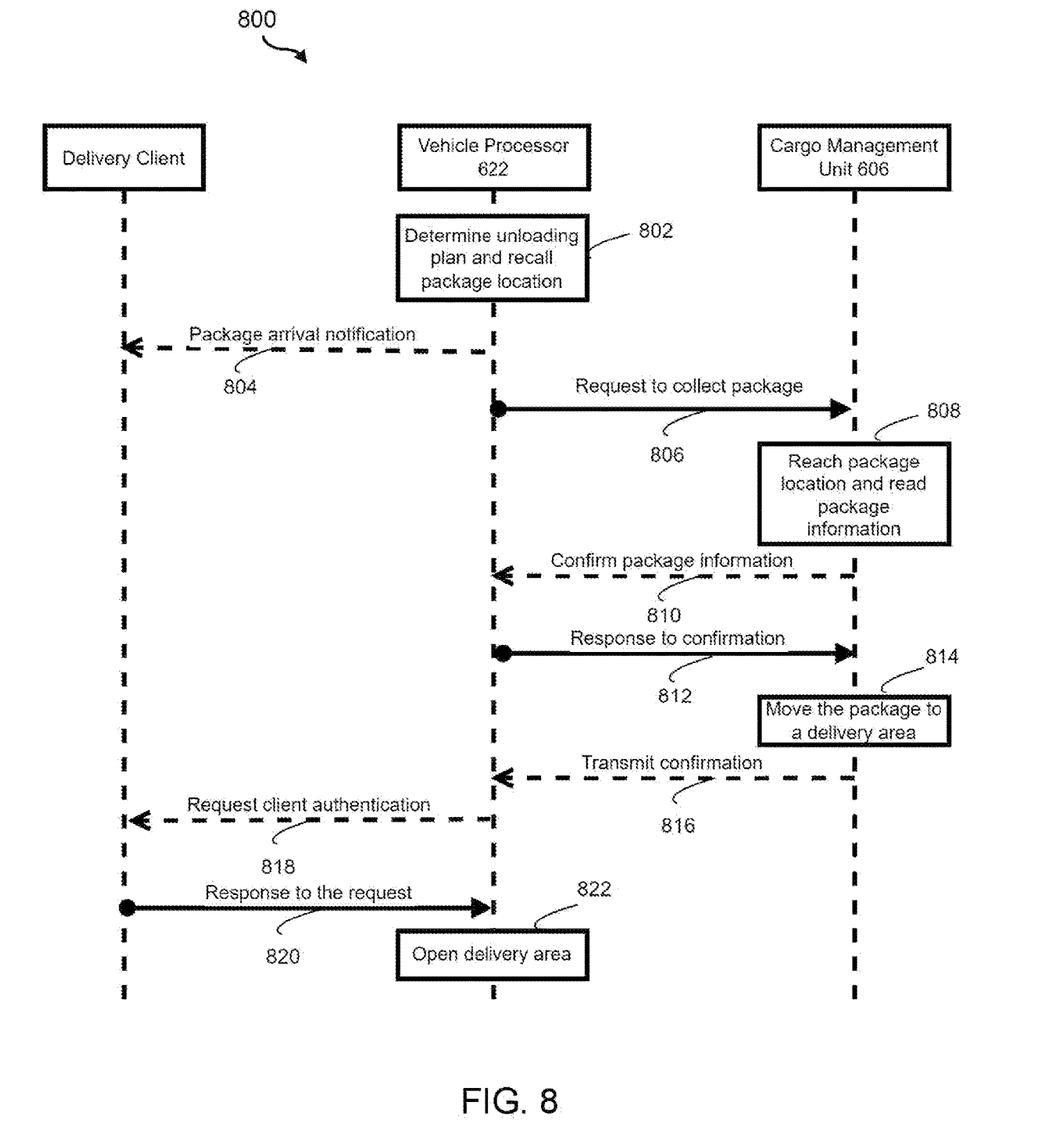
FIG. 8 depicts a sequential diagram of an example method for unloading packages from a delivery vehicle, in accordance with the present disclosure.

FIG. 8 depicts a sequential diagram of an example method 800 for unloading packages from a delivery vehicle, in accordance with the present disclosure. In particular, the method 800 describes a process of unloading packages from a delivery vehicle (such as the delivery vehicle 602). FIG. 8 may be described with continued reference to prior figures, including FIGS. 1-7. The following process is exemplary and not confined to the steps described hereafter. Moreover, alternative embodiments may include more or less steps that are shown or described herein and may include these steps in a different order than the order described in the following example embodiments.

At step 802, the vehicle processor 622 may determine package unloading plan and recall loading location (e.g., by using the loading location information stored in the memory 624). In particular, the vehicle processor 622 may determine the package unloading plan based on the package delivery schedule. In some aspects, when the vehicle processor 622 determines that the package is to be delivered at the next delivery stop, the vehicle processor 622 may determine the unloading plan and recall the package location. In addition, the vehicle processor 622 may transmit a package arrival notification to a delivery client (to whom the package is to be delivered), at step 804. In some aspects, the delivery client may be a package customer, a drone, or any autonomous vehicle/device.

At step 806, the vehicle processor 622 may transmit a request to the cargo management unit 606 to collect/pick the package placed at the loading location, based on the package unloading plan and the loading location information. In other words, the vehicle processor 622 may transmit unloading movement instructions to the cargo management unit 606 to pick the package. At step 808, the cargo management unit 606 may actuate the first motor 616 and/or second motor 618 to move to the loading location. When the cargo management unit 606 reaches the loading location, the cargo management unit 606 may read (e.g., by using the detection unit 612) the package information present on the package. At step 810, the cargo management unit 606 may transmit the package information to the vehicle processor 622 to confirm the package. In other words, the cargo management unit 606 may confirm with the vehicle processor 622, whether the cargo management unit 606 has picked the correct package.

At step 812, the vehicle processor 622 may transmit a response to the confirmation to the cargo management unit 606. In particular, the vehicle processor 622 may confirm whether the package scanned by the cargo management unit 606 is the correct package. In other words, the vehicle processor 622 may confirm if the package scanned by the cargo management unit 606 is the package to be delivered at the next delivery stop. In a scenario where the package information does not match with the information stored in the memory 624, the vehicle processor 622 may provide feedback (along with instructions) to the cargo management unit 606 to search for the correct package.

At step 814, when the vehicle processor 622 confirms the package, the cargo management unit 606 may move the package to the delivery area.

At step 816, the cargo management unit 606 may transmit a movement confirmation to the vehicle processor 622. In other words, the cargo management unit 606 may inform the package status to the vehicle processor 622 (e.g., whether the package is moved to the delivery area).

At step 818, the vehicle processor 622 may perform client authentication, by sending an authentication request to the delivery client (e.g., to a delivery client device). In other words, the vehicle processor 622 may confirm whether the delivery client is an authentic client associated with the package. At step 820, the delivery client may provide, via the client device, a confirmation to the authentication request. The processor 622 may perform the client authentication by using any known manner (e.g., by the use of a one-time password).

At step 822, the vehicle processor 622 may open the delivery area, when the vehicle processor 622 authenticates the delivery client. The delivery client may then pick the package from the delivery area.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A delivery vehicle comprising:
   a set of rails;
   a cargo management unit slidably engaged with the set of rails, wherein the cargo management unit is configured to engage with a package and move the package inside the delivery vehicle, and wherein the cargo management unit comprises:
   a gripping member comprising a lower claw and an upper claw, wherein the lower claw and the upper claw are attached with each other via a pair of first line screws, and wherein the lower claw and the upper claw are configured to move vertically along the pair of first line screws to secure the package;
   a second line screw configured to engage with the gripping member and a first rail, wherein the gripping member is configured to rotate along a second line screw axis, and move vertically along the second line screw; and
   a scanner configured to read a package information on the package; and
   a processor communicatively coupled to the scanner, wherein the processor is configured to:
   obtain the package information from the scanner;
   determine a loading and unloading movement plan for the package based on the package information; and
   actuate the cargo management unit to move inside the delivery vehicle based on the loading and unloading movement plan.

2. The delivery vehicle of claim 1, wherein the cargo management unit further comprises a first motor connected to a line screw drive base having a set of rollers, and wherein the first motor is configured to move or rotate the cargo management unit inside the delivery vehicle via the set of rollers.

3. The delivery vehicle of claim 2, wherein the actuation comprises actuating the first motor to move or rotate the cargo management unit inside the delivery vehicle.

4. The delivery vehicle of claim 2, wherein the first motor is configured to rotate the second line screw to move the gripping member vertically.

5. The delivery vehicle of claim 1, wherein the gripping member further comprises a second motor to move the lower claw or the upper claw vertically.

6. The delivery vehicle of claim 5, wherein the second motor is configured to move the lower claw or the upper claw based on a package dimension.

7. The delivery vehicle of claim 1, wherein the set of rails comprises the first rail and a pair of second rails, and wherein the first rail is slidably engaged with the pair of second rails.

8. The delivery vehicle of claim 7, wherein the first rail is perpendicularly attached to the pair of second rails, and wherein the first rail is attached between the pair of second rails.

9. The delivery vehicle of claim 8, wherein the first rail is configured to move the cargo management unit forward and backward, and wherein the pair of second rails is configured to move the cargo management unit in left and right direction.

10. The delivery vehicle of claim 1 further comprises a plurality of shelves to store the package inside the delivery vehicle, and wherein the plurality of shelves comprises slots.

11. The delivery vehicle of claim 10, wherein a slot shape and size correspond to a gripping member shape and size.

12. The delivery vehicle of claim 1 further comprises a memory configured to store the loading and unloading movement plans of a plurality of packages, and a delivery route for the delivery vehicle.

13. The delivery vehicle of claim 12, wherein the determination comprises receiving the loading and unloading movement plan from the memory.

14. The delivery vehicle of claim 12, wherein the memory is further configured to store a package location of each package placed inside the delivery vehicle.

15. The delivery vehicle of claim 1, wherein the pair of first line screws and the second line screw are parallel to each other.

16. A method for managing movement of a plurality of packages in a delivery vehicle, the method comprising:
  obtaining, via a processor, a package information from a scanner installed in a cargo management unit, wherein the cargo management unit is configured to engage with a package and move the package inside the delivery vehicle, wherein the cargo management unit is slidably engaged with a set of vehicle rails, and wherein the cargo management unit comprises:
    a gripping member comprising a lower claw and an upper claw, wherein the lower claw and the upper claw are attached with each other via a pair of first line screws, and wherein the lower claw and the upper claw are configured to move vertically along the pair of first line screws to secure the package; and
    a second line screw configured to engage with the gripping member and a first vehicle rail, wherein the gripping member is configured to rotate along a second line screw axis, and move vertically along the second line screw;
  determining, via the processor, a loading and unloading movement plan for the package based on the package information; and
  actuating, via the processor, the cargo management unit to move inside the delivery vehicle based on the loading and unloading movement plan.

17. The method of claim 16, wherein the loading and unloading movement plan for each package is stored in a vehicle memory, and wherein the loading and unloading movement plan comprises instructions to actuate the cargo management unit.

18. The method of claim 17, wherein determining comprises receiving the loading and unloading movement plan from the vehicle memory.

19. The method of claim 17, wherein the vehicle memory is further configured to store a package location of each package placed inside the delivery vehicle.

20. A non-transitory computer-readable storage medium in a distributed computing system, the non-transitory computer-readable storage medium having instructions stored thereupon which, when executed by a processor, cause the processor to:
  obtain a package information from a scanner installed in a cargo management unit, wherein the cargo management unit is configured to engage with a package and move the package inside a delivery vehicle, wherein the cargo management unit is slidably engaged with a set of vehicle rails, and wherein the cargo management unit comprises:
    a gripping member comprising a lower claw and an upper claw, wherein the lower claw and the upper claw are attached with each other via a pair of first line screws, and wherein the lower claw and the upper claw are configured to move vertically along the pair of first line screws to secure the package; and
    a second line screw configured to engage with the gripping member and a first vehicle rail, wherein the gripping member is configured to rotate along a second line screw axis, and move vertically along the second line screw;
  determine a loading and unloading movement plan for the package based on the package information; and
  actuate the cargo management unit to move inside the delivery vehicle based on the loading and unloading movement plan.

* * * * *